(12) United States Patent
Nielinger et al.

(10) Patent No.: US 9,651,177 B2
(45) Date of Patent: May 16, 2017

(54) COUPLING CONNECTION FOR CORRUGATED PIPES

(71) Applicant: Brugg Rohr AG Holding, Brugg (CH)

(72) Inventors: Helga Nielinger, Neustadt (DE); Marc Post, Huelsede (DE); Joern Homann, Hannover (DE)

(73) Assignee: BRUGG ROHR AG HOLDING, Brugg (CH)

( * ) Notice: Subject to any disclaimer, the term of this patent is extended or adjusted under 35 U.S.C. 154(b) by 108 days.

(21) Appl. No.: 14/689,132

(22) Filed: Apr. 17, 2015

(65) Prior Publication Data

US 2015/0300541 A1     Oct. 22, 2015

(30) Foreign Application Priority Data

Apr. 17, 2014  (DE) .................. 10 2014 105 555

(51) Int. Cl.
| | |
|---|---|
| *F16L 15/04* | (2006.01) |
| *F16L 15/08* | (2006.01) |
| *F16L 21/03* | (2006.01) |
| *F16L 21/04* | (2006.01) |
| *F16L 25/00* | (2006.01) |
| *F16L 33/26* | (2006.01) |

(52) U.S. Cl.
CPC ............. *F16L 15/04* (2013.01); *F16L 15/08* (2013.01); *F16L 21/03* (2013.01); *F16L 21/04* (2013.01); *F16L 25/0036* (2013.01); *F16L 33/26* (2013.01)

(58) Field of Classification Search
CPC .... F16L 25/0036; F16L 25/0063; F16L 21/04
USPC ......................................................... 285/903
See application file for complete search history.

(56) References Cited

U.S. PATENT DOCUMENTS

| | | | |
|---|---|---|---|
| 2,685,459 A | | 8/1954 | Panagrossi |
| 3,844,587 A | * | 10/1974 | Fuhrmann ............... F16L 23/12 285/903 |

(Continued)

FOREIGN PATENT DOCUMENTS

| | | | |
|---|---|---|---|
| AT | 502404 B1 | * 3/2007 | .......... F16L 25/0036 |
| CH | 589249 A5 | 6/1977 | |

(Continued)

*Primary Examiner* — David E Bochna
(74) *Attorney, Agent, or Firm* — Leydig, Voit & Mayer, Ltd.

(57) ABSTRACT

A coupling connection for corrugated pipes includes a coupling element, a support ring which is attachable in a positive fit against an inner wall face of the corrugated pipe, a first annular element which is axially fixable on a circumferential face of the corrugated pipe, a portion of the corrugated pipe being enclosed between the support ring and the first annular element and being fixable axially immovably, and an annular sealing chamber, enclosed circumferentially in a transition region between the support ring and the corrugated pipe, receiving a sealing element, on which a deformation force acts in a functional position which is fixable using a fixing element, including a second annular element, which circumferentially encloses the coupling element and is circumferentially attachable and movable in translation with respect thereto, the first annular element and the second annular element being arranged mutually coaxially.

19 Claims, 3 Drawing Sheets

(56) References Cited

U.S. PATENT DOCUMENTS

| | | | | |
|---|---|---|---|---|
| 4,063,757 A | * | 12/1977 | Fuhrmann | F16L 33/01 285/903 |
| 4,875,720 A | * | 10/1989 | Sasa | F16L 37/101 285/903 |
| 4,907,830 A | * | 3/1990 | Sasa | F16L 25/0045 285/903 |
| 5,738,385 A | | 4/1998 | Homann et al. | |
| 6,742,815 B2 | * | 6/2004 | McCurdy | F16L 33/01 285/903 |
| 6,993,819 B2 | * | 2/2006 | Homann | F16L 25/0036 29/458 |
| 8,485,562 B2 | * | 7/2013 | Zerrer | F16L 25/0036 285/903 |

FOREIGN PATENT DOCUMENTS

| | | | | |
|---|---|---|---|---|
| CH | DE 102006014971 A1 * | 5/2007 | | F16L 25/0036 |
| DE | 3302450 C2 | 7/1984 | | |
| DE | 3341297 C2 | 6/1985 | | |
| DE | 4027818 A1 | 3/1992 | | |
| DE | 4105782 A1 * | 9/1992 | | F16L 25/0036 |
| DE | 29518712 U1 | 1/1996 | | |
| DE | 20113861 U1 | 1/2002 | | |
| DE | 10065573 A1 | 7/2002 | | |
| DE | 10245979 A1 | 4/2004 | | |
| DE | 10300417 A1 | 7/2004 | | |
| DE | 202004007321 U1 | 8/2004 | | |
| DE | 202005001018 U1 | 3/2005 | | |
| DE | 102012213211 A1 * | 1/2014 | | F16L 25/0036 |
| EP | 0775865 B1 | 5/1997 | | |
| EP | 1457726 B1 | 9/2004 | | |
| JP | EP 1058042 A2 * | 12/2000 | | F16L 25/0036 |
| JP | WO 2011126128 A1 * | 10/2011 | | F16L 25/0036 |
| SU | 896309 A1 | 1/1982 | | |

* cited by examiner

COUPLING CONNECTION FOR CORRUGATED PIPES

CROSS-REFERENCE TO PRIOR APPLICATION

Priority is claimed to German Patent Application No. DE 10 2014 105 555.1, filed on Apr. 17, 2014, the entire disclosure of which is hereby incorporated by reference.

FIELD

The invention relates to a coupling connection for corrugated pipes in the form of a fluid line, comprising a coupling element, a support ring which is attachable in a positive fit against an inner wall face of the corrugated pipe, a first annular element which is fixable axially immovably on a circumferential face of the corrugated pipe, a portion of the corrugated pipe being enclosed between the support ring and the first annular element and being fixable axially immovably, and an annular sealing chamber, enclosed circumferentially in a transition region between the support ring and the corrugated pipe, receiving a sealing element, on which a deformation force acts in a functional position which is fixable using a fixing element.

BACKGROUND

A generic coupling connection is known for example from EP 0 775 865 B1, which relates to an arrangement for connecting a corrugated pipe to a coupling element. The coupling connection has a support ring which can be screwed into the corrugated pipe and the end of which protrudes from the corrugated pipe. An annular element configured as a pressure ring is screwed far enough onto the corrugated pipe that the end of the corrugated pipe protrudes out. Together with the pressure ring, the coupling element forms a sealing chamber, in which a graphite sealing ring is arranged. The sealing ring is deformed and compressed as a result of the pressure ring and connection element being pulled together axially. Bolts are provided for this purpose, or a separate tool if no bolts are used. In this variant, the compressed state is fixed in that the coupling element overhangs the pressure ring and the overhanging end is deformed. Alternatively, one or more pins as fixing elements may fix the pressure ring with respect to the coupling element.

EP 1 457 726 B1 likewise relates to attaching a coupling connection of this type to a helically corrugated metal pipe, in which a support ring is screwed far enough into the end of the metal pipe that a smooth-walled region having a smaller external diameter than the clear width of the metal pipe both remains within the metal pipe and overhangs the end of the metal pipe, in such a way that a coupling piece can be inserted between the metal pipe and the support ring. As a result, a graphite sealing ring, arranged on the circumference of the smooth-walled region of the support ring, is axially and radially deformed and compressed between the coupling piece and the pressure ring. For this purpose, holes in the flange in the pressure ring of the coupling piece make it possible to bring the flanges together using bolts.

The high complexity of manufacture, linked to the required low tolerance in the connection region of the support ring with respect to the coupling piece, is found to be a drawback of the above-described coupling connections. In particular, on the one hand, the relative movability has to be ensured, so as to be able to compress the sealing ring in the sealing chamber; on the other hand, the fluid supplied to the corrugated pipe should be reliably prevented from penetrating into the interior of the sealing chamber.

Of course, forming the support ring and the coupling piece in one piece has also been considered, but in the coupling connections this means dispensing with the sealing ring, which is in turn required for the pressure ring and the reliable transmission of the forces which occur during operation.

Another connection type for corrugated metal pipes is described in DE 33 02 450 C2. A support bushing is screwed onto the end of a corrugated pipe and a pipe connector is screwed into the end of the corrugated pipe. The sealing is brought about in that the clear width of the support bushing increases towards the end or the external diameter of the pipe connector decreases towards the end. When the pipe connector is screwed into the corrugated pipe end, which is adapted to the internal contour of the outer bushing using a forming tool, the corrugated pipe is sealed between the pipe connector and the support bushing.

DE 40 27 818 A1 discloses a coupling fitting for corrugated pipes, which comprises an outer bushing, screwed onto the corrugated pipe end and having a smooth pipe attachment overhanging the corrugated pipe end. The smooth pipe attachment has an internal thread, into which a coupling pipe piece is screwed. A stepped end of the coupling pipe piece penetrates into the corrugated pipe. When the coupling pipe piece is screwed in, the corrugation of the corrugated pipe is buckled. The sealing is provided by a graphite sealing cord, which is laid in the last corrugation waves and which deforms when the corrugation is buckled and is pressed against the inner wall of the outer bushing and the stepped end of the pipe connector penetrating into the corrugated pipe end.

DE 33 41 297 C2 discloses a sealing packing for sealing corrugated pipes, which is formed from two bushings, which are arranged movably with respect to one another on the corrugated pipe and fit inside one another, and between which an annular space surrounding the corrugated pipe is formed for receiving a graphite sealant. A corrugated pipe sleeve, applied to the sealing region from the inside, is provided.

It is further known from CH 589 249 A5 to roll the end of a corrugated metal pipe against the inner face of a flange, smoothing out the corrugation. As a result of the high contact pressure which occurs during the rolling, a tight press fit comes about between the previously corrugated metal pipe and the metal flange. This type of connection requires a high equipment outlay at the assembly site and necessitates thick-walled cast parts.

SUMMARY

A coupling connection for corrugated pipes, comprising: a coupling element, a support ring which is attachable in a positive fit against an inner wall face of the corrugated pipe, a first annular element which is axially fixable on a circumferential face of the corrugated pipe, a portion of the corrugated pipe being enclosed between the support ring and the first annular element and being fixable axially immovably, and an annular sealing chamber, enclosed circumferentially in a transition region between the support ring and the corrugated pipe, receiving a sealing element, on which a deformation force acts in a functional position which is fixable using a fixing element, including a second annular element, which circumferentially encloses the coupling element and is circumferentially attachable and movable in translation with respect thereto, the first annular element and the second annular element being arranged mutually coaxially, in such a way that an outer circumferential face of one annular element is positioned against an inner circumferential face of the other annular element in a contact region and the annular elements are movable in translation relative to one another along a slide guide formed by the contact region, the sealing element being compressible in the sealing chamber by the relative translational movement of the annular elements and the relative position of the annular elements which corresponds to this functional position being fixable using the fixing element, and the support ring being integrally connected to the coupling element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
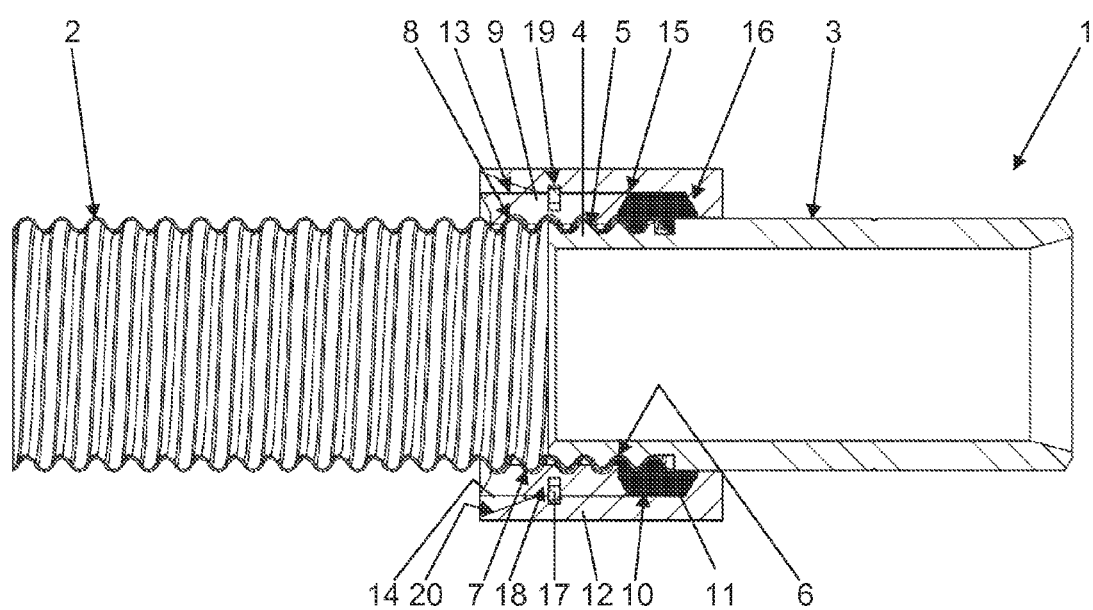
FIG. 1 shows a coupling connection in which an inner annular element is fixed to a corrugated pipe.

The present invention provides a coupling connection that is simultaneously simple to manufacture and reliable in operation, that can be assembled without difficulty, and in which penetration of supplied fluid into the sealing space and impairment of the fluid flow within the corrugated pipe are reliably prevented.

According to the invention, the coupling connection has a second annular element, which circumferentially encloses the coupling element and is movable in translation with respect thereto, the first annular element and the second annular element being arranged mutually coaxially, in such a way that an outer circumferential face of one annular element is positioned against an inner circumferential face of the other annular element in a contact region and the annular elements are movable in translation relative to one another along a slide guide formed by the contact region, the sealing element being compressible in the sealing chamber by the relative translational movement of the annular elements and the relative position of the annular elements which corresponds to this functional position being fixable using the fixing element, and the support ring being integrally connected to the coupling element.

The coupling connection is particularly advantageous if the support ring is integrally connected to the coupling element and the fixing of the corrugated pipe at the coupling connection and the sealing are provided by way of the two annular elements. As a result, first a dividing plane in the interior of the coupling element is dispensed with, which in the art on the one hand requires complex measures for sealing and on the other hand is often connected to a discontinuity in the line cross section, in particular with a discontinuous change in cross section, which leads to flow or pressure losses. At the same time, according to the invention separate sealing of the sealing chamber from the fluid flowing through the corrugated pipe is also dispensed with, because the sealing is limited to the circumferential transition region of the corrugated pipe at the support ring, which is particularly simple to seal. However, the particularly advantageous technical use of the coupling connection is not only due to the separating plane, which is absent according to the invention by contrast with the prior art, and the sealing, which is also dispensed with. Rather, it results in further specific advantages. In particular, according to the invention, when the coupling connection is fixed and the sealing element is compressed, the coupling element is not shifted, in other words axially displaced, with respect to the corrugated pipe. As a result, the problem occurring in the art whereby the coupling piece is shortened after the seal is compressed is overcome. In the art, this shortening can lead to problems in particular because the connection is not releasable, and can thus no longer be varied or adapted in length. Rather, according to the invention, the sealing can be provided reliably by compressing the sealing element even if the coupling element is poorly accessible or completely inaccessible, since according to the invention the two annular elements are merely displaced towards one another for this purpose. Thus, during the compression, there is also no force transmitted to the corrugated pipe or the coupling piece in the longitudinal direction, and they thus remain unstressed.

The invention makes it much simpler to adapt and maintain predetermined target lengths of the coupling connection connected to the corrugated pipe, it additionally being possible to check visually, in a simple manner, that the functional position has been achieved. Further, a connection is created, in particular an unreleasable connection, which is particularly compact and simple to produce and in which the sealing element is arranged in the force shunt, in such a way that the sealing and thus the sealing effect are not impaired by an external load or a thermal load on the corrugated pipe, which is preferably helically corrugated.

Preferably, the sealing chamber is formed in and bridges a transition region between the corrugated pipe and a circumferential region of the coupling element, in such a way that the sealing element is simultaneously positioned against the corrugated pipe and the coupling element, sealing them from one another.

The two annular elements may be fixed with respect to one another for example by a welded connection in the contact region of the annular elements. Further, a collar may engage over the two annular elements so as to fix them. However, it is particularly simple if the annular elements can be fixed unreleasably in a predetermined relative position by the fixing element which comprises at least one securing ring and which is arranged in the contact region between the outer circumferential face of one annular element and the inner circumferential face of the other annular element. This results in the two annular elements being fixed rapidly and reliably, the fixing element additionally being optimally protected from environmental influences and from attempts at manipulation. Moreover, in this way a slender and circumferentially smooth, preferably cylindrical construction is provided, which substantially simplifies the laying of the corrugated pipe coupled in this manner.

According to the invention, the annular element fixed to the corrugated pipe may alternatively externally enclose the other annular element or is conversely externally encompassed thereby. However, it is particularly advantageous if the first annular element is fixable to the corrugated pipe, since as a result two sleeve-shaped annular elements of approximately equal material thicknesses can be provided, which are in particular subjected to corresponding thermal expansion and can additionally be produced cost-effectively.

The sealing chamber is limited radially at the circumference by one of the annular elements and limited in each axial direction by a respective end face of the two annular elements. Particularly preferably, the sealing chamber is limited in each axial direction by a face, at an inclination to the cross-sectional plane, of the two annular elements, which thus leads to a directed displacement and compression in a radially inward direction. The sealing element is thus specifically pressed against the transition region between the corrugated pipe and the support ring, further improving the sealing effect.

The coupling connection is not limited to a single coupling element. Rather, the coupling connection may also be configured for connecting a plurality of corrugated pipes or be configured as a branching element, in that the coupling connection for connecting at least two corrugated pipes is equipped with a plurality of support rings and a plurality of pairs of first and second annular elements. Naturally, this does not preclude a variant in which the coupling element is configured as a single pipe connector, for example for coupling by means of a welded connection.

The annular elements may be dimensioned differently in terms of the axial length thereof. However, it is particularly practical if in the functional position the annular elements each have an end face arranged in a shared cross-sectional plane of the coupling connection, in such a way that, during the assembly of the coupling connection, the desired target position in accordance with a shared coupling plane can be ensured in a simple manner by visual testing by checking the two end faces.

If has further been found to be particularly expedient if the inner circumferential face and/or the outer circumferential face have a conical or dome-shaped portion, by means of which the fixing element is deformable counter to a resilient restoring force of the fixing element by way of the translational relative movement of the annular elements. As a result of this configuration, the displacement of the annular elements towards one another thus brings about either compression or expansion of the fixing element, which leads to automatic positive connection by undercut, for example in an annular groove, when the target position in the functional position is achieved. This does not require an additional tool for deforming the fixing element or an additional working step.

In this way, the annular elements can be unreleasably connected in the functional position by the fixing element, so as to prevent damage-free separation thereof. This configuration is found to be particularly expedient in particular in security-related line connections.

The sealing effect may be limited to the region of the portion of the coupling element forming the support ring, so as to ensure the desired functionality of the coupling connection. Further, a variant is also particularly expedient in which the second annular element can be laid circumferentially with respect to the coupling element, in particular tightly, so as to achieve further improved sealing.

It is further advantageous if the second annular element is rotationally engaged with the coupling element and/or the first annular element. This prevents the coupling element from turning together with the support ring relative to the annular elements and thus being able to be unscrewed from the corrugated pipe. For example, a shaping extending parallel to the longitudinal axis in the manner of a feather key or a keyway is suitable for a rotational engagement of this type.

The sealing can be adapted to the intended purpose without difficulty, without having to change the constructional configuration for this purpose. However, it is particularly expedient if the sealing element is a sealing ring having a substantial graphite material proportion.

FIG. 1 is a sectional side view of a coupling connection 1 for corrugated pipes 2, which is equipped with a coupling element 3 for coupling (not shown) for example to stationary elements. The coupling element 3 is integrally connected to a support ring 4, which is formed by a portion, provided with an external thread 5, of the coupling element 3. This portion forming the support ring 4 is positioned positively against an inner wall face 6 of the corrugated pipe 2, by being screwed into the corrugated pipe 2. A first annular element 9 equipped with a corresponding internal thread 8 is fixed to a circumferential face 7 of the corrugated pipe 2, an end portion of the corrugated pipe 2 being enclosed between the support ring 4 and the first annular element 9 and thus being fixed. As a result, the forces occurring during operation are transmitted from the corrugated pipe 2 by means of the first annular element 9 to the support ring 4 and thus to the coupling element 3.

In addition, an annular sealing chamber 10, which receives a sealing element 11, is provided circumferentially on the coupling connection 1 in a transition region between the support ring 4 and the corrugated pipe 2. The sealing element 11 is configured as a graphite ring and is compressed by approximately 20% to 40% by a second annular element 12 in the sealing chamber. For this purpose, the second annular element 12 circumferentially encloses both the coupling element 3 and the first annular element 9 and is movable in translation with respect thereto. In this way, an outer circumferential face 13 of the first annular element 9 is positioned against an inner circumferential face 14 of the second annular element 12 in a contact region and the annular elements 9, 12 are moved in translation relative to one another along a slide guide formed by the contact region, and as a result the sealing element 11 is compressed in the sealing chamber 10 by means of mutually opposing inclined faces 15, 16 of the two annular elements 9, 12, and the desired sealing is achieved.

In this functional position of the annular elements 9, 12, a fixing element 17 configured as a securing ring simultaneously engages in a groove 18 in the outer circumferential face 13 of the first annular element 9 and in a further groove 19 in the inner circumferential face 14 of the second annular element 12, and thus forms a positive unreleasable connection. For this purpose, the inner circumferential face 14 of the second annular element 12 comprises a conical portion 20, by way of which the fixing element 17 is pressed into the groove 18 of the first annular element 9 counter to a resilient restoring force of the fixing element 17 as a result of the translational relative movement of the annular elements 9, 12 and automatically juts out when the flush position of the two grooves 18, 19 is achieved.

Figure 2:
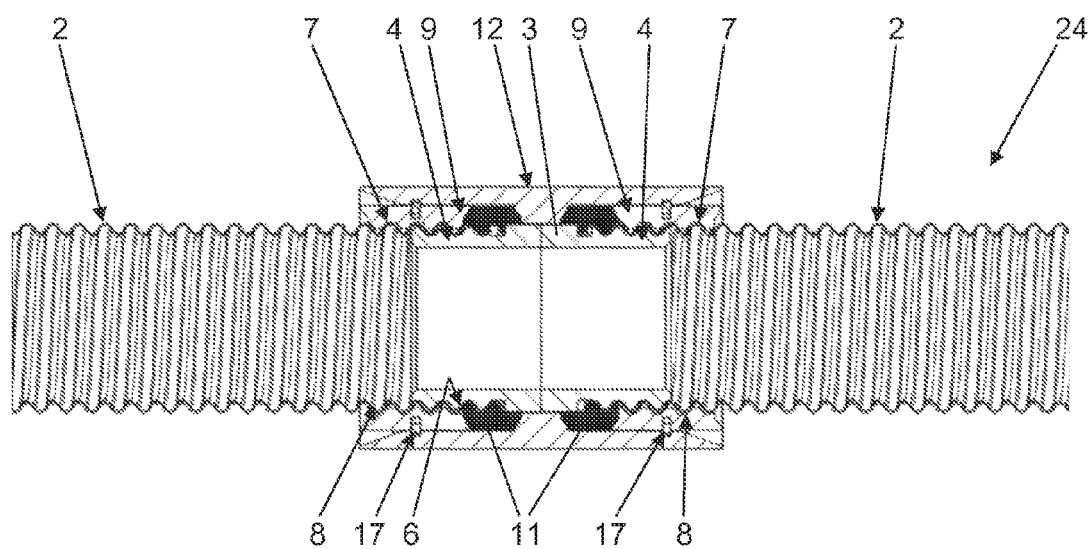
FIG. 2 shows a modified coupling connection according to FIG. 1 for connecting two corrugated pipes.

FIG. 2 is a sectional view of a variant of a coupling connection 24 configured as a pipe coupling, by way of which two corrugated pipes 2 of identical construction are interconnected. At the two end portions, the coupling element 3 is formed integrally with a support ring 4 formed by the respective end portion. This portion which forms the support ring 4 is positioned positively against an inner wall face 6 of the corrugated pipe 2, by being screwed into the corrugated pipe 2. On a circumferential face 7 of the two corrugated pipes 2, a first annular element 9 equipped with a corresponding internal thread 8 is provided in each case, an end portion of the corrugated pipe 2 being enclosed between the support ring 4 and the first annular element 9 and thus being fixed. A second annular element 12, which circumferentially encloses the two first annular elements 9 and the coupling element 3, is movable in translation with respect thereto.

For assembly, the two corrugated pipes 2 comprising the respective support ring 4 and the first annular element 9 are inserted into the second annular element 12 from opposite sides after the introduction of the sealing element 11. In this functional position of the annular elements 9, 12, a fixing element 17 configured as a securing ring respectively positively engages in the grooves, opposing in this context, of the annular elements 9, 12, and thus forms a reliable connection having a high mechanical load-bearing capacity.

Figure 3:
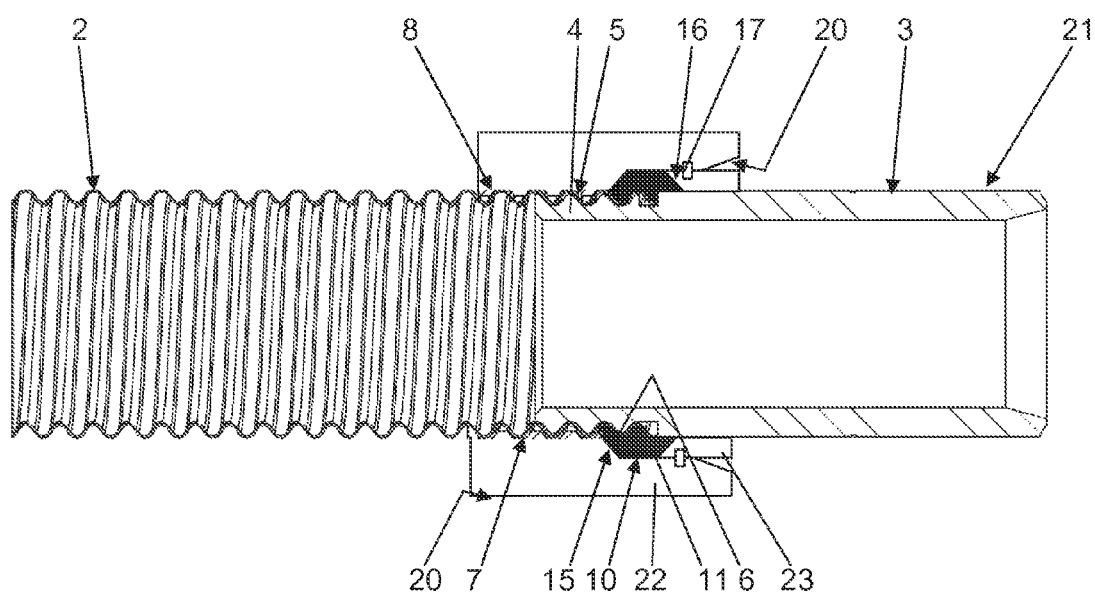
FIG. 3 shows a variant of a coupling connection in which an outer annular element is fixed to the corrugated pipe.

By contrast, in the variant of a coupling connection 21 shown in FIG. 3, a first annular element 22 fixed to the corrugated pipe 2 is larger than a second annular element 23. As a result, the second annular element 23 between the first annular element 22 and the coupling element 3 is inserted into the annular groove limited thereby. The sealing chamber 10 is thus reduced by the insertion of the second annular element 23 into the first annular element 22 and the sealing element 11 is thus compressed.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A coupling connection for a corrugated pipe, comprising:
    a coupling element;
    a support ring configured to be attached in a positive fit against an inner wall face of the corrugated pipe, the support ring being integrally connected to the coupling element;
    a first annular element configured to be axially fixable on a circumferential face of the corrugated pipe, a portion of the corrugated pipe being enclosed between the support ring and the first annular element and configured to be fixable axially immovably;
    an annular sealing chamber enclosed circumferentially in a transition region between the support ring and the corrugated pipe, the annular sealing chamber configured to receive a sealing element on which a deformation force acts in a functional position, the functional position being fixable using a fixing element; and
    a second annular element circumferentially enclosing the coupling element and configured to be circumferentially attachable and movable in translation with respect thereto, the first annular element and the second annular element being arranged mutually coaxially in such a way that an outer circumferential face of one annular element is positioned against an inner circumferential face of the other annular element in a contact region and the annular elements are movable in translation relative to one another along a slide guide formed by the contact region,
    wherein the sealing element is compressible in the sealing chamber by the relative translational movement of the annular elements and the relative position of the annular elements, which corresponds to the functional position being fixable using the fixing element; and
    wherein at least one of the inner circumferential face of the second annular element or the outer circumferential face of the first annular element includes a conical or dome-shaped portion, by which the fixing element is deformable counter to a resilient restoring force thereof by way of the translational relative movement of the annular elements.

2. The coupling connection of claim 1, wherein the annular elements can be fixed in a predetermined relative position by way of the fixing element arranged in the contact region, the fixing element comprising at least one securing ring.

3. The coupling connection of claim 1, wherein the first annular element is fixable to the corrugated pipe.

4. The coupling connection of claim 1, wherein the sealing chamber is limited in each axial direction by a face, at an inclination to the cross-sectional plane, of the two annular elements.

5. The coupling connection of claim 1, wherein the coupling connection for connecting at least two corrugated pipes is equipped with a plurality of support rings and a plurality of pairs of first and second annular elements.

6. The coupling connection of claim 1, wherein in the functional position the annular elements each have an end face arranged in a shared cross-sectional plane of the coupling connection.

7. The coupling connection of claim 1, wherein the inner circumferential face of the second annular element includes a conical portion, by which the fixing element is deformable counter to a resilient restoring force thereof by way of the translational relative movement of the annular elements.

8. The coupling connection of claim 7, wherein the outer circumferential face of the first annular element includes a conical portion, by which the fixing element is deformable counter to a resilient restoring force thereof by way of the translational relative movement of the annular elements.

9. The coupling connection of claim 1, wherein the annular elements are unreleasably connected in the functional position by the fixing element.

10. The coupling connection of claim 1, wherein the second annular element is configured to be attached tightly with respect to the coupling element.

11. The coupling connection of claim 1, wherein the second annular element is rotationally engaged with at least one of the coupling element or the first annular element.

12. The coupling connection of claim 1, wherein the sealing element is a sealing ring having a substantial graphite material proportion.

13. The coupling connection of claim 1, wherein the sealing element is a sealing ring comprising graphite.

14. The coupling connection of claim 1, wherein the sealing element is a sealing ring consisting essentially of graphite.

15. The coupling connection of claim 1, wherein the sealing element is compressable by 20% to 40% by the second annular element in the sealing chamber.

16. The coupling connection of claim 1, wherein the inner circumferential face of the second annular element includes a dome-shaped portion, by which the fixing element is deformable counter to a resilient restoring force thereof by way of the translational relative movement of the annular elements.

17. The coupling connection of claim 16, wherein the outer circumferential face of the first annular element includes a dome-shaped portion, by which the fixing element is deformable counter to a resilient restoring force thereof by way of the translational relative movement of the annular elements.

18. The coupling connection of claim 1, wherein the outer circumferential face of the first annular element includes a conical portion, by which the fixing element is deformable counter to a resilient restoring force thereof by way of the translational relative movement of the annular elements.

19. The coupling connection of claim 1, wherein the outer circumferential face of the first annular element includes a dome-shaped portion, by which the fixing element is deformable counter to a resilient restoring force thereof by way of the translational relative movement of the annular elements.

* * * * *